US006995346B2

(12) United States Patent
Johanneson et al.

(10) Patent No.: US 6,995,346 B2
(45) Date of Patent: Feb. 7, 2006

(54) FIXED PATTERN NOISE COMPENSATION WITH LOW MEMORY REQUIREMENTS

(75) Inventors: Anders Johanneson, Hellviken (SE); Ingemar Larsson, Malmo (SE)

(73) Assignee: Dialog Semiconductor GmbH, Kirchheim/Teck-Nabern (DE)

(*) Notice: Subject to any disclaimer, the term of this patent is extended or adjusted under 35 U.S.C. 154(b) by 263 days.

(21) Appl. No.: 10/328,157

(22) Filed: Dec. 23, 2002

(65) Prior Publication Data

US 2004/0113052 A1    Jun. 17, 2004

(30) Foreign Application Priority Data

Dec. 11, 2002    (EP) .................................. 02392021

(51) Int. Cl.
*H01L 27/00*    (2006.01)
*G06K 9/40*    (2006.01)

(52) U.S. Cl. ............................. 250/208.1; 250/214.1; 382/246; 348/241

(58) Field of Classification Search ............ 250/208.1, 250/214.1; 382/246, 274, 275; 348/241, 348/242, 250
See application file for complete search history.

(56) References Cited

U.S. PATENT DOCUMENTS

| 4,392,157 | A | * | 7/1983 | Garcia et al. ............... 348/243 |
| 5,047,861 | A | * | 9/1991 | Houchin et al. ............ 348/247 |
| 5,065,444 | A | * | 11/1991 | Garber ...................... 382/275 |
| 5,812,703 | A | | 9/1998 | Juen et al. .................. 382/274 |
| 5,987,156 | A | * | 11/1999 | Ackland et al. ............ 382/125 |
| 6,061,092 | A | | 5/2000 | Bakhle et al. .............. 348/243 |
| 6,144,408 | A | | 11/2000 | MacLean .................... 348/241 |
| 6,215,113 | B1 | | 4/2001 | Chen et al. ................ 250/208.1 |
| 6,266,449 | B1 | * | 7/2001 | Ohsawa ...................... 382/239 |
| 6,366,320 | B1 | | 4/2002 | Nair et al. ................... 348/300 |
| 6,473,124 | B1 | * | 10/2002 | Panicacci et al. ........... 348/241 |
| 6,538,695 | B1 | * | 3/2003 | Xiao et al. .................. 348/245 |
| 6,643,402 | B1 | * | 11/2003 | Okada ......................... 382/232 |

(Continued)

FOREIGN PATENT DOCUMENTS

GB    2314227 A    12/1997

(Continued)

OTHER PUBLICATIONS

Baxes, Gregory A., Digital Image Processing: Principles and Applications, John Wiley & Sons, Inc., 1994, pp. 193-196.*

(Continued)

*Primary Examiner*—David Porta
*Assistant Examiner*—Davienne Monbleau
(74) *Attorney, Agent, or Firm*—George D. Saile; Stephen B. Ackerman

(57) ABSTRACT

A method and a system for the compensation of Fixed Pattern Noise (FPN) in digital images have been achieved. The FPN compensation is based on processing done during the production of said images. The fixed pattern noise is here defined as the fixed pattern seen in the individual pixel offsets. The fixed pattern noise is uncorrelated noise but it has a statistical distribution that can be scaled to fit all images. The general idea is to measure the distribution for each individual camera, compress it, and save it in the module. For each image that is then taken with the module the noise pattern can be retrieved and rescaled to fit the image. Covered pixels are employed to normalize the FPN data to the current frame. In order to minimize memory requirements a compression scheme has to be used. A method combining a quantization step with a non-lossy compression is used. The black level is corrected for as part of the operation.

44 Claims, 2 Drawing Sheets

U.S. PATENT DOCUMENTS

| | | | |
|---|---|---|---|
| 6,711,299 B2 * | 3/2004 | Chao et al. | 382/240 |
| 6,744,910 B1 * | 6/2004 | McClurg et al. | 382/124 |
| 6,748,116 B1 * | 6/2004 | Yue | 382/238 |
| 6,819,800 B2 * | 11/2004 | Jung et al. | 382/240 |
| 2003/0198400 A1 * | 10/2003 | Alderson et al. | 382/274 |

FOREIGN PATENT DOCUMENTS

| | | |
|---|---|---|
| JP | 1045380 | 2/2001 |

OTHER PUBLICATIONS

Rao, K. R., et al., Techniques and Standards for Image, Video, and Audio Coding, Prentice Hall, PTR, 1996, pp. 133-139.*

Rabbani, Majid, et al., Digital Image Compression Techniques, SPIE Optical Engineering Press, 1991, pp. 22-32.*

* cited by examiner

FIXED PATTERN NOISE COMPENSATION WITH LOW MEMORY REQUIREMENTS

BACKGROUND OF THE INVENTION (1) Field of the Invention

This invention relates generally to image processing and relates more particularly to a method to reduce the fixed pattern noise in an obtained image.

(2) Description of the Prior Art

CMOS-based cameras are being plagued by a defect known as "fixed pattern noise" (FPN) This is an annoying stationary background pattern in the image that results from small differences in the behaviour of the individual pixel amplifiers. FPN (also called nonuniformity) is the spatial variation in pixel output values under uniform illumination due to device and interconnect parameter variations (mismatches) across the sensor. FPN is fixed for a given sensor, but varies from sensor to sensor, so if $v_o$ is the nominal pixel output value (at uniform illumination), and the output pixel values (excluding temporal noise) from the sensor are $v_{oij}$ for $1 \leq i \leq n$ and $1 \leq j \leq m$, then the fixed pattern noise is the set of values $\Delta v_{oij} = v_{oij} - v_o$.

FPN consists of offset and gain components, the offset component causes more degradation in image quality at low illumination. CMOS (Active Pixel Sensors—APS— and Passive Pixel Sensors—PPS—) suffer from column FPN, which appears as "stripes" in the image and can result in significant image degradation. CCD image sensors only suffer from pixel FPN due to spatial variation in photodetector geometry and dark current. Using CMOS technology image sensors pixel transistors cause additional pixel FPN and column amplifiers cause column FPN.

In prior art, the normal way to reduce FPN is to do a so-called Correlated Double Sampling (CDS). This involves sampling the output twice, once right after reset and the second time with the signal present. The offset and reset noises are reduced by taking the difference. Most sensors cannot implement a true CDS and thus cannot fully compensate offset FPN.

Dark frame subtraction comprises to capture one or more dark frames under the actual picture taking conditions (exposure time and sensor temperature), and the frame or average of multiple frames is subtracted from the image. Dark frame compensation can be used but requires an external shutter and a full frame memory and is therefore an expensive solution to reduce the FPN problem.

There are patents dealing with the suppression of FPN:

U.S. Pat. No. 6,061,092 to Bakhle et al. describes a method and an apparatus for dark frame cancellation for CMOS sensor-based tethered video peripherals. The elimination of dark fixed pattern noise (DFPN) for tethered CMOS sensor-based digital video cameras is supported by supplying and maintaining a host-based dark image cache. Since the camera is tethered to a host computer system such as a PC, it takes advantage of the storage and processing capabilities of the host to manage the cache. By using a dark image cache for updating of the currently applicable dark image for DFPN cancellation processing, operation of the camera shutter for acquiring dark images is dramatically reduced. Dark images are obtained at different integration, gain, and temperature operating characteristics of the camera and stored in the cache. The cached dark images are referenced on the host according to a fixed, predetermined column of data in video frames generated by the CMOS sensor image array of the camera. The dark column data represents a portion of the CMOS sensor image array that is permanently and totally shadowed for use during DFPN cancellation processing.

U.S. Pat. No. 6,215,113 to Chen et al. discloses a CMOS active pixel sensor with motion detection including a photo diode, a reset switch, two sample and hold circuits, and two readout circuits. In addition to a CMOS sensor array, a row of CMOS active pixel sensors (APS) can be added to reduce the fixed pattern noise caused by process variations. Each of the CMOS APS cells of this additional row is the same as the CMOS APS cells in said CMOS sensor array except that the photo diode area thereof is covered by a metal layer to block the incident light. Therefore, the readout signals of the pixels in this additional row should be fixed signals after the reset process and should be independent of the incident light. When an image signal of a selected APS cell is read out, a signal of the shielded APS cell in the same column with the selected APS cell is also read out. The final image is the difference of these two signals. Since these two readout values pass through the same readout circuit, the effect of process variation can be cancelled and the fixed pattern noise can be reduced.

U.S. Pat. No. 6,366,320 to Nair et al. discloses a semiconductor circuit having an analog storage array and a sense amplifier array in which each sense amp cell generates a differential signal pair in response to receiving first and second signals from the storage array. The sense amp array is a row of sense amplifier cells, one sense amp cell for each column. The sense amplifier cells implement correlated double sampling (CDS) of pixel signals. CDS is used to reduce fixed pattern noise in pixel signals. Fixed pattern noise refers to errors in otherwise identical pixel signal values that are caused by manufacturing variations between the pixels. CDS requires sampling both the pre-exposure "reset value" and the post-exposure "exposed value" of each pixel signal. The two values are then transferred as a differential signal pair to a signal-processing pipe. There the values are correlated or simply subtracted to cancel the errors caused by differences between reset values and circuitry in the pixels of the manufactured array.

SUMMARY OF THE INVENTION

A principal object of the present invention is to achieve a compensation of fixed pattern noise in digital images with low memory requirement.

A further object of the present invention is to achieve a compensation of fixed pattern noise in digital images without the need of an external shutter In accordance with an object of this invention a further method to compensate fixed pattern noise of digital images without the need of an external shutter is achieved. Said method comprises first, providing a non-volatile memory, a processing device, calibration frames, and an image sensor. The steps of said method comprises to derive FPN data for each sensor using calibration frames, to store FPN data measured, to retrieve FPN data for each picture taken and to apply FPN data on each pixel of pictures taken to compensate fixed pattern noise.

In accordance with the objects of this invention a further method to compensate fixed pattern noise of digital images without the need of an external shutter and with low memory requirements is achieved. Said method comprises, first, providing a non-volatile memory, a processing device, calibration frames, and an image sensor. The first steps of said method comprises to derive FPN data for each sensor using calibration frames, reduce said FPN data derived, to perform compression on FPN data and to store factor used for data reduction, compressed FPN data, compression table used, and distribution measurement results in said non-volatile memory. Further steps comprise to perform decompression on FPN data, to perform scaling of reduced FPN data using current statistical distribution measurement, and to apply individual compensation value on each pixel.

In accordance with the objects of this invention a further method to compensate fixed pattern noise of digital images without the need of an external shutter and with low memory requirements is achieved. Said method comprises first, providing a non-volatile memory, a processing device, calibration frames, and an image sensor. The first steps of said method comprise to derive FPN data for each sensor using calibration frames, to quantize said FPN data derived, to generate an optimized Huffman table, to perform Huffman compression on FPN data using optimized Huffman table, and to store quantization factor, compressed FPN data, Huffman compression table used, and distribution measurement results. Further steps comprise to perform Huffman decompression on FPN data, to perform quantization scaling using current statistical distribution measurement, and to apply individual compensation value on each pixel.

In accordance with the objects of this invention a system to compensate fixed pattern noise of digital images without the need of an external shutter and with low memory requirements is achieved. Said system comprises a non-volatile memory, a processing device, and an image sensor.

BRIEF DESCRIPTION OF THE DRAWINGS

In the accompanying drawings forming a material part of this description, there is shown.

DESCRIPTION OF THE PREFERRED EMBODIMENTS

The preferred embodiment disclose a system and a method to reduce the fixed pattern noise (FPN) without the need of an external shutter requiring a small memory only as compared with prior art using Correlated Double Sampling (CDS) or Dark Frame Subtraction where a full frame memory is required.

In the novel method invented the FPN compensation is based on processing done during production. The fixed pattern noise is here defined as the fixed pattern seen in the individual pixel offsets. This noise increases in amplitude with increasing temperature and exposure time.

Figure 1:
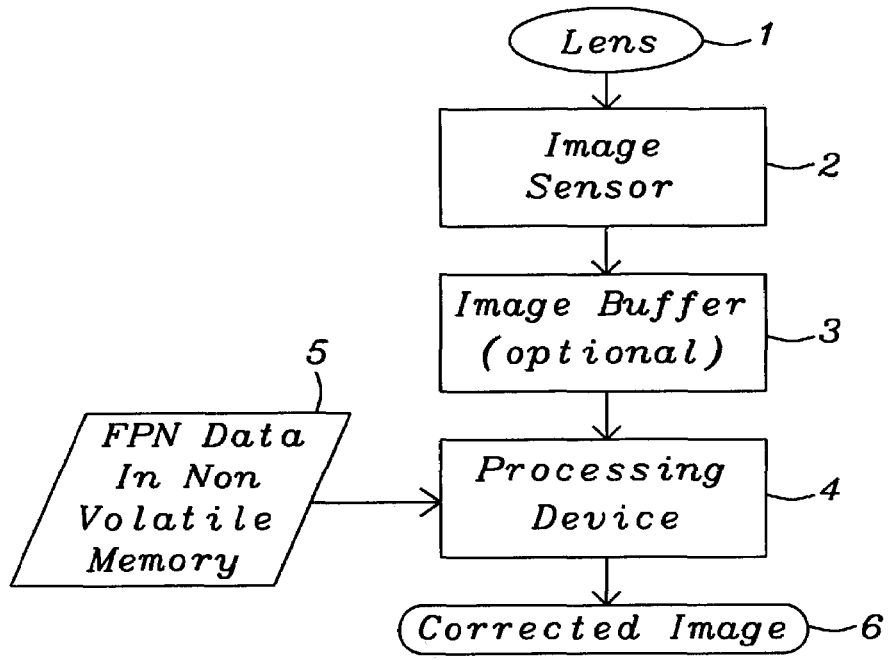
FIG. 1 shows the major components of a system to compensate fixed pattern noise.

The fixed pattern noise is uncorrelated noise but it has a statistical distribution that can be scaled to fit all images. The idea is to measure said distribution once for each individual camera during production, compress it, and save it in a non-volatile memory. For each image that is then taken with the module the noise pattern can be retrieved and rescaled to fit the image FIG. 1 describes the basic components of the system invented. Said system comprises a lens or a lens system 1, an image sensor 2, an optional image buffer 3, a processing device 4 using FPN data stored in a non-volatile memory 5 to eliminate the FPN of the sensor. The number 6 represents the corrected image. Said optional image buffer can be implemented by a RAM buffer.

Figure 2:
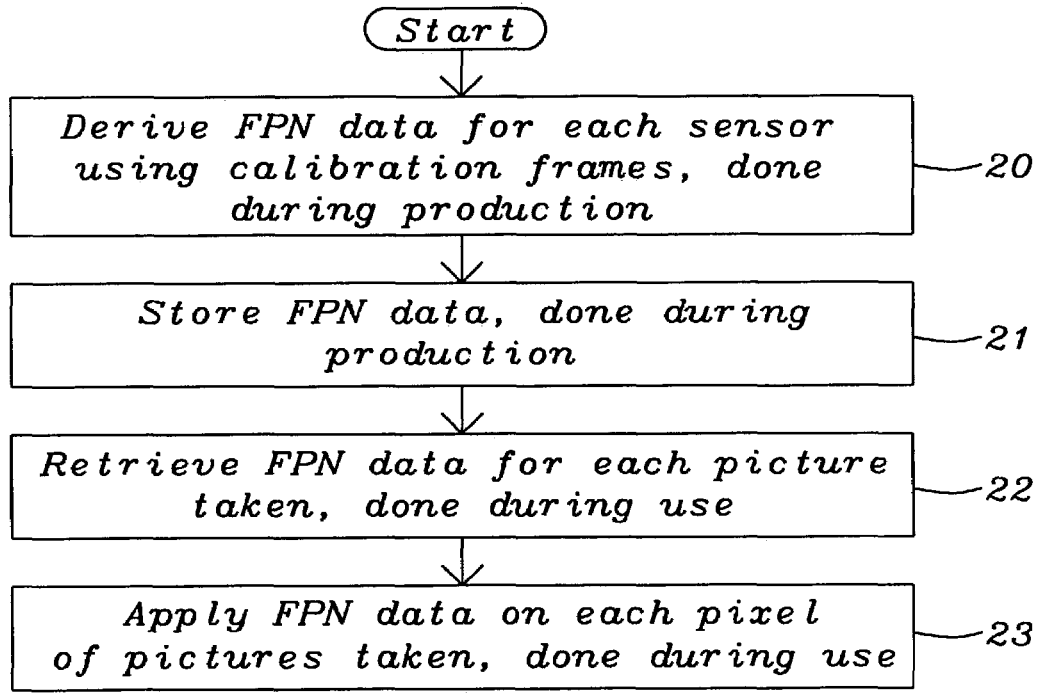
FIG. 2 shows a flowchart of a method to compensate fixed pattern noise without the need of an external shutter

FIG. 2 describes the basic steps of the method invented. In step 20 the FPN distribution of the FPN data are derived for each sensor using calibration frames. Said FPN data are stored in a non-volatile memory in step 21. Step 20 and 21 are performed only once for each sensor during production of the camera. In step 22 said FPN data are retrieved from said non-volatile memory for each picture taken and applied in step 23 on each pixel of the images taken to compensate Fixed Pattern Noise.

In a preferred embodiment quantization is employed to reduce the amount of data and a non-lossy compression scheme is used to minimize memory requirements. Quantization is the division of a quantity into a discrete number of small parts, often assumed to be integral multiples of a common quantity. The quantization level is defined in the quantization process as the discrete value assigned to a particular subrange of the signal being quantized. Depending on the quantization level used a reasonable compression results in the order of 2.5 bits per pixel. The black level is corrected for as part of the operation.

Figure 3:
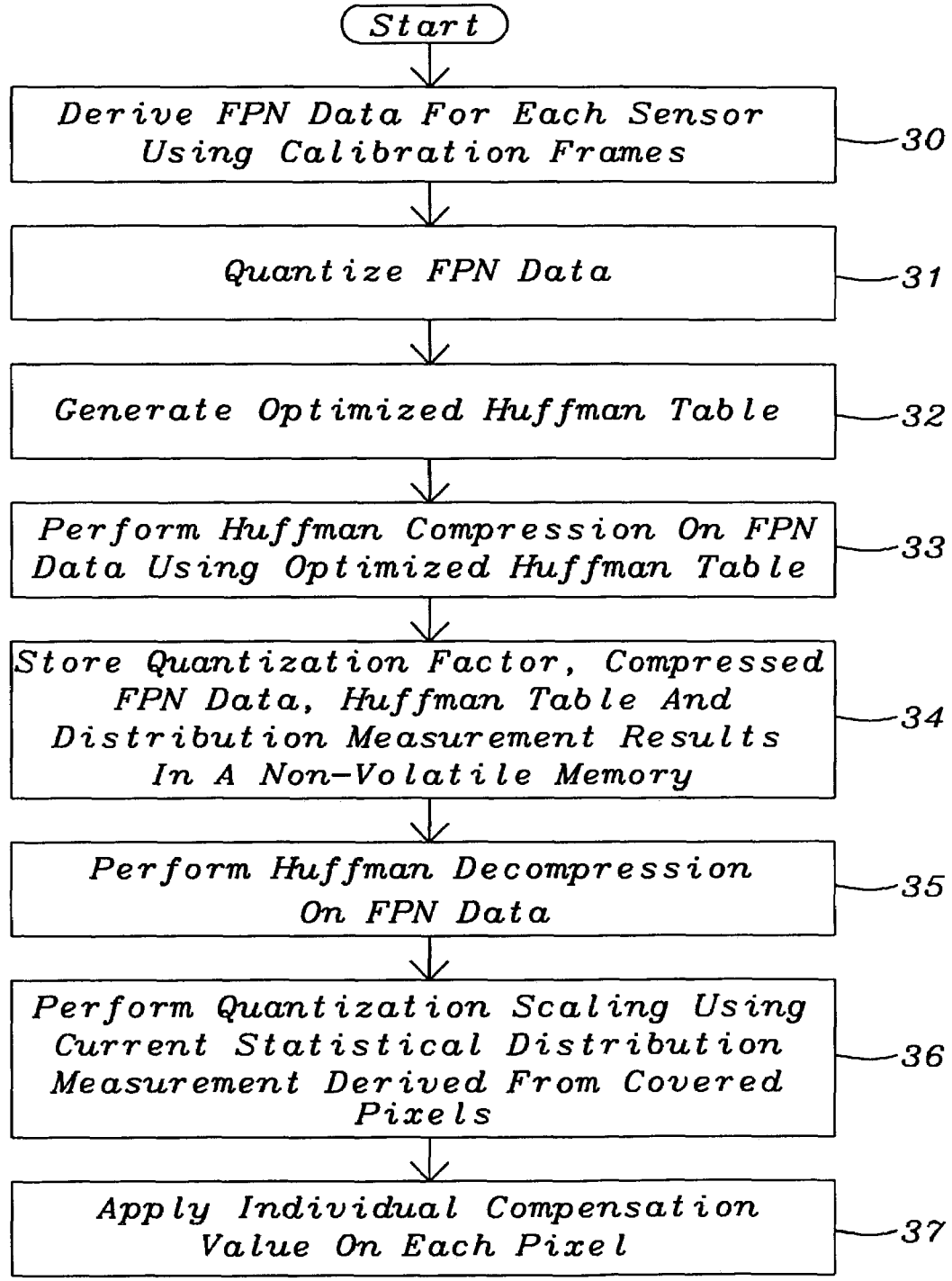
FIG. 3 shows a flowchart of a preferred embodiment of a method to compensate fixed pattern noises without the need of an external shutter and with low memory requirements.

FIG. 3 describes the method used in a preferred embodiment of the invention to compensate Fixed Pattern Noise (FPN). In step 30 the FPN data are derived for each sensor using calibration frames. Said calibration frames are obtained at high temperatures with long exposure times with the camera lens covered. Said FPN data comprise the device and interconnect parameter variations (mismatches) across a sensor. In the next step 31 said FPN data are reduced by quantizing said parameter variations of the FPN data. Said FPN data are categorized into discrete number of categories. Step 32 and 33 deal with a compression of said quantized FPN data. In our preferred embodiment the Huffman compression algorithm has been used. Any other non-lossy compression method could be employed as well.

The Huffman compression algorithm is an algorithm to compress data. It does this by assigning smaller codes to frequently used symbols and longer codes for symbols that are less frequently used. A Huffman code can be represented as a binary tree whose leaves are the symbols that are encoded. At each non-leaf node of the tree there is a set containing all the symbols in the leaves that lie below the node. In addition, each leaf is assigned a weight (which is the frequency of the symbols), and each non-leaf node contains a weight that is the sum of all weights of the leaves lying below it. In step 32 an optimized Huffman table is generated, in other words a tree is defined, which will encode the FPN data with the fewest bits, and to save the symbols and the codes for each symbol along with the length of each code in a file in the form of a table. In step 33 the quantized FPN data are compressed using said optimized Huffman table. In step 34 said quantization factor used in step 31, the compressed FPN data, the Huffman table generated in step 32 and used in the compression step 33, and the distribution measurement is saved in a non-volatile memory. In a preferred embodiment the standard deviation $\sigma$ has been employed to describe said distribution. Other distribution parameters could be used as well.

Steps 30 to 34 are calibration steps. Said calibration is performed once for each sensor during production of said sensor. The following steps are application steps, performed for each image taken.

Step 35 describes the Huffman decompression of the FPN data stored in the memory. First, the Huffman tree is regenerated from the table stored in the memory as well. Once this process is completed a complete Huffman tree is obtained. Said tree is used to search for the character that was represented by the code in the compressed file. Using the regenerated Huffman tree the decompression is performed and the decompressed FPN data are directly used or saved in an output file.

In step 36 a quantization scaling is performed using the quantization factor stored in the non-volatile memory and the current statistical distribution measurement. The impact of temperature and exposure time on the fixed pattern noise is considered by a normalization of the stored data by statistical data obtained from "covered pixels". "Covered pixels" are pixels having covered with metal or other opaque materials. In a preferred embodiment the data is normalized by the standard deviation $\sigma$ of the calibration image and scaled by the standard deviation $\sigma'$ of the target image. Another statistical distribution measurement could be used as well.

Finally, in step 37 the scaled quantization data of step 36 are applied to each of the pixels of the image taken. The standard deviation $\sigma$ of the covered pixels in the target image is used for the above-mentioned scaling and the average is used for blacklevel subtraction. The fixed pattern noise is compensated without the need of an additional external shutter and with low memory requirements.

What is claimed is:

1. A method to compensate fixed pattern noise of digital images without the need of an external shutter comprising:
   providing a non-volatile memory, a processing device, calibration frames, and an image sensor;
   derive FPN data for each sensor using calibration frames, wherein said calibration frames are obtained at high temperatures, which are close to maximum allowable temperature of the image sensor, with long exposure time, being at the high end of the range of exposure time the image sensor is used for having the camera lens covered;
   store FPN data measured;
   retrieve FPN data for each picture taken; and
   apply individual FPN data on each pixel of pictures taken to compensate fixed pattern noise.

2. The method of claim 1 wherein said FPN data comprise the device and interconnect parameter variations across said sensor.

3. The method of claim 1 wherein said image sensor is a CMOS image sensor.

4. The method of claim 1 wherein said image sensor is a CCD image sensor.

5. The method of claim 1 wherein said non-volatile memory is a Flash Memory.

6. The method of claim 1 wherein said non-volatile memory is an MRAM.

7. The method of claim 1 wherein said non-volatile memory is an EPROM.

8. The method of claim 1 wherein said processing device is a microprocessor.

9. A method to compensate fixed pattern noise of digital images without the need of an external shutter and with low memory requirements comprising:
   providing a non-volatile memory, a processing device, calibration frames, and an image sensor;
   derive FPN data for each sensor using calibration frames, wherein said calibration frames are obtained at high temperatures, which are close to maximum allowable temperature of the image sensor, with long exposure time being at the high end of the range of exposure time the image sensor is used for, having the camera lens covered;
   reduce said FPN data derived;
   perform compression on FPN data;
   store factor used for data reduction, compressed FPN data, compression table used, and distribution measurement results in said non-volatile memory;
   perform decompression on FPN data;
   perform scaling of reduced FPN data using current statistical distribution measurement; and
   apply individual compensation value on each pixel.

10. The method of claim 9 wherein said FPN data comprise the device and interconnect parameter variations across said sensor.

11. The method of claim 9 wherein said data reduction is performed by a quantization of said FPN data and the related quantization factor is stored together with the FPN data and said scaling of the reduced FPN data is performed using said quantization factor.

12. The method of claim 11 wherein said quantization is comprising a normalization by standard deviation $\sigma$ of the calibration image and a scaling by standard deviation $\sigma'$ of the target image.

13. The method of claim 9 wherein a standard deviation is used for said distribution measurement.

14. The method of claim 9 wherein said image sensor is a CMOS image sensor.

15. The method of claim 9 wherein said image sensor is a CCD image sensor.

16. The method of claim 9 wherein said non-volatile memory is a Flash Memory.

17. The method of claim 9 wherein said non-volatile memory is an MRAM.

18. The method of claim 9 wherein said non-volatile memory is an EPROM.

19. The method of claim 9 wherein a non-lossy compression method is used for said compression and decompression of FPN data.

20. The method of claim 19 wherein said compression and decompression of FPN data is performed using the Huffman compression algorithm.

21. The method of claim 9 wherein said processing device is a microprocessor.

22. A method to compensate fixed pattern noise of digital images without the need of an external shutter and with low memory requirements comprising:
   providing a non-volatile memory, a processing device, calibration frames, and an image sensor;
   derive FPN data for each sensor using calibration frames, wherein said calibration frames are obtained at high temperatures, which are close to maximum allowable temperature of the image sensor, with long exposure time, being at the high end of the range of exposure time the image sensor is used for, having the camera lens covered;
   quantize said FPN data derived;
   generate optimized Huffman table;
   perform Huffman compression on FPN data using optimized Huffman table;
   store quantization factor, compressed FPN data, Huffman compression table used, and distribution measurement results;
   perform Huffman decompression on FPN data;
   perform quantization scaling using current statistical distribution measurement; and
   apply individual compensation value on each pixel.

23. The method of claim 22 wherein pixels of said image sensor are covered with opaque material.

24. The method of claim 23 wherein said opaque material is metal.

25. The method of claim 23 wherein the impact of temperature and exposure time on the fixed pattern noise is considered by a normalization of stored FPN data by statistical data obtained from said covered pixels.

26. The method of claim 22 wherein standard deviation is used for said distribution measurement.

27. The method of claim 22 wherein said quantization scaling is comprising a normalization by standard deviation $\sigma$ of the calibration image and a scaling by standard deviation $\sigma'$ of the target image.

28. The method of claim 22 wherein said image sensor is a CMOS image sensor.

29. The method of claim 22 wherein said image sensor is a CCD image sensor.

30. The method of claim 22 wherein said non-volatile memory is a Flash Memory.

31. The method of claim 22 wherein said non-volatile memory is an MRAM.

32. The method of claim 22 wherein said non-volatile memory is an EPROM.

33. The method of claim 22 wherein said processing device is a microprocessor.

34. A system to compensate fixed pattern noise of digital images without the need of an external shutter and due to FPN data compression with low memory requirements comprising:

a non-volatile memory;

a processing device being capable to reduce FPN data, to perform compression on FPN data, to perform decompression on FPN data, to perform scaling of reduced FPN data, and to apply individual compensation value on each pixel; and an image sensor.

35. The system of claim 34 wherein said image sensor is a CMOS image sensor.

36. The system of claim 34 wherein said image sensor is a CCD image sensor.

37. The system of claim 34 wherein said non-volatile memory is a Flash Memory.

38. The system of claim 34 wherein said non-volatile memory is an MRAM.

39. The system of claim 34 wherein said non-volatile memory is an EPROM.

40. The system of claim 34 wherein said processing device is a microprocessor.

41. The system of claim 34 wherein an optional image buffer is used.

42. The system of claim 41 wherein said optional image buffer is a RAM.

43. The system of claim 34 wherein some of the pixels of said image sensor are covered with opaque material.

44. The system of claim 43 wherein said opaque material is metal.

* * * * *